(12) United States Patent
Price

(10) Patent No.: US 6,651,947 B1
(45) Date of Patent: Nov. 25, 2003

(54) POPCORN BAG SUPPORT DEVICE

(76) Inventor: Jonathan Anton Price, 218 Sunnyslope, SW., Albuquerque, NM (US) 87105

( * ) Notice: Subject to any disclaimer, the term of this patent is extended or adjusted under 35 U.S.C. 154(b) by 0 days.

(21) Appl. No.: 09/364,150

(22) Filed: Jul. 30, 1999

Related U.S. Application Data

(60) Provisional application No. 60/094,873, filed on Jul. 30, 1998.

(51) Int. Cl.$^7$ ................................................. A47K 1/08
(52) U.S. Cl. ................................ 248/311.2; 248/205.3; 220/737; 229/904; 297/188.14
(58) Field of Search ....................... 248/220.21, 220.22, 248/225.11, 225.21, 311.2, 301, 305, 316.7, 213.2, 215, 912, 205.3; 297/194, 191, 188.18, 188.15, 188.14, 188.21, 188.01, 188.12, 188.2; 220/737; 229/904, 906

(56) References Cited

U.S. PATENT DOCUMENTS

| 1,086,541 A | * | 2/1914 | Lailer .......................... 248/311.2 |
| D47,085 S | | 3/1915 | Veith |
| 2,279,442 A | * | 4/1942 | Burns et al. .............. 248/311.2 |
| 2,628,054 A | * | 2/1953 | Fazakerley ................. 248/311.2 |
| 3,128,984 A | * | 4/1964 | Palm ........................ 248/311.2 |
| 3,604,020 A | * | 9/1971 | Moisa ............................ 4/228 |
| 3,738,723 A | | 6/1973 | Rudolph et al. |
| 3,990,654 A | * | 11/1976 | Michael ..................... 248/311.2 |
| 4,183,444 A | * | 1/1980 | English et al. .............. 220/200 |
| 4,483,502 A | * | 11/1984 | Fast .......................... 248/222.1 |
| 4,491,220 A | | 1/1985 | Daviss |
| 4,620,631 A | | 11/1986 | Bartelt |
| 5,108,000 A | | 4/1992 | Stoll et al. |
| 5,165,639 A | * | 11/1992 | Knuppe ....................... 248/215 |
| 5,429,262 A | | 7/1995 | Sharkey |
| 5,464,183 A | | 11/1995 | McConnell et al. |
| 5,542,634 A | * | 8/1996 | Pomerantz ................... 248/214 |
| 5,720,516 A | | 2/1998 | Young |
| 5,775,570 A | | 7/1998 | Kim |
| 5,855,186 A | * | 1/1999 | Larsen ........................ 119/116 |
| 5,865,412 A | | 2/1999 | Mason |
| 5,934,637 A | * | 8/1999 | Robinson .................. 248/311.2 |
| 5,941,019 A | * | 8/1999 | Guarriello, Sr. et al. ..... 47/66.6 |

OTHER PUBLICATIONS

Hubert Company Online Store, Adhesive Merchandising Strip, 1998–2002.*

* cited by examiner

Primary Examiner—Gwendolyn Baxter
(74) Attorney, Agent, or Firm—Rod D. Baker; Andrea L. Mays; Peacock, Myers & Adams, PC

(57) ABSTRACT

A hook and tab apparatus for supporting concessions upon a stadium chair armrest having a support arm attachable to the armrest and a receiving arm connected to the support arm. A tab is affixed to the concessions container and defines an opening for hanging the container over the receiving arm.

7 Claims, 6 Drawing Sheets

POPCORN BAG SUPPORT DEVICE

CROSS-REFERENCE TO RELATED APPLICATIONS

This application claims the benefit of the filing of U.S. Provisional Patent Application Ser. No. 60/094,873, entitled Popcorn Bag Container Support Device, filed on Jul. 30, 1998, and the specification thereof is incorporated herein by reference.

BACKGROUND OF THE INVENTION

1. Field of the Invention (Technical Field)

The present invention relates to a holder for attachment of a popcorn bag to the armrest of a seat in a movie theatre or other place of exhibition of cultural or sporting events.

2. Background Art

It is usual, if not common that people attending movie theatres will obtain refreshment drink as well as a bag of popcorn for consumption during the course of a movie. Many movie theatres today have seats which include at least one arm having a cup holder at the forward end of the arm. An example of this type of movie theatre seat is shown in FIGS. 5 and 6. The cup holder may be a simple cylindrical ring formed of plastic or other material and may comprise an integral part of the arm of the seat. While the cup holder provides a convenient resting place for the refreshment drink, there is no comparable device for supporting a bag of popcorn which the moviegoer may also be consuming.

The present invention solves the problem of supporting a bag of popcorn, or indeed a box or cup or other container for popcorn, preferably from the arm of the seat in the theatre or stadium. Basically, the invention is composed of a hook which attaches to the forward portion of the cup holder or armrest and has a receiving arm that receives the opening of a tab affixed to the popcorn bag. However, several embodiments are presented.

Prior patents related to the field of the present invention but which are quite different from the present invention include: U.S. Pat. No. 5,720,516, to Young, entitled "Concession Goods Holder;" U.S. Pat. No. 4,491,220, to Daviss, entitled "Container for Holding Popcorn and a Drink Cup;" U.S. Pat. No. 5,464,183, to McConnell et al., entitled "Stroller Accessory Bar and Drink Holder;" U.S. Pat. No. 5,865,412, to Mason, entitled "Beverage Container Holder;" U.S. Pat. No. 5,775,570, to Kim, entitled "Food Container Adaptable for Holding a Drink Cup;" U.S. Pat. No. 5,429,262, to Sharkey, entitled "Auxilliary Condiment Container;" U.S. Pat. No. 5,108,000, to Stoll et al., entitled "Recyclable Materials Caddy for Hanging Attachment to a Waste Receptacle;" U.S. Pat. No. 4,620,631, to Bartelt, entitled "Device for Holding Containers;" U.S. Pat. No. 3,738,723, to Rudolph et al., entitled "Convertible Capsule Container;" and U.S. Pat. No. 47,085, to Veith, entitled "Popcorn Bag."

SUMMARY OF THE INVENTION (DISCLOSURE OF THE INVENTION)

In summary, the present invention is an apparatus for supporting concessions upon a stadium chair armrest comprising a tab defining an opening in a concessions container, for example a popcorn bag, and also comprising a hook having a support arm and a receiving arm. The support arm is attachable to the armrest of the stadium chair and the receiving arm is engageable with the opening in the tab, which is attached to the concessions container. The hook can be shaped in various fashions, but preferably shaped as an S-hook or a U-hook. The hook has an overall horizontal width extending from the armrest of between approximately $3/16$ and $5/16$ inches. This way, the hook does not protrude too far into the space between adjacent rows of stadium seating. The support arm of the hook can be temporarily attached to the stadium chair armrest, preferably over the rim of the armrest cup holder. In this embodiment no adhesive or connecting means such as a rivet is used and the hook is engaged with, for example the armrest cup holder, via a friction fit. In this embodiment the user can easily remove the hook from the armrest. In an alternative embodiment the support arm of the hook is permanently attachable to the stadium chair armrest. In this embodiment the hook is additionally adhered with an adhesive, double-sided tape, rivet, or other connecting means so that the hook is permanently attached to the armrest and the user cannot remove it. In yet another embodiment the hook support arm is integrated with the stadium chair armrest. In this embodiment the hook is manufactured into a surface of the armrest or preferably the armrest cup holder and the receiving arm extends outward from the armrest or armrest cup holder. This is an even more permanent embodiment of the hook.

The tab of the present invention can be attachable to both the inside and outside surfaces of a sidewall of the concessions container to provide additional support. An adhesive can be used to attach the tab to the concessions container sidewall surfaces. Of course, the tab need only be attachable to one surface of a sidewall of the concession's container, but adhering to both inside and outside surfaces is preferred for added stability.

In an alternative embodiment the hook is comprised of a support arm attachable to the armrest and a receiving arm, such as described above, and the concessions container has an opening in a sidewall to hook over the receiving arm. A stabilizing piece is integral with the concessions container to define the opening and provide additional strength. This stabilizing piece is manufactured into the concessions container.

In yet another embodiment, the hook is integral with the concessions container and is either manufactured into the concessions container or affixed to the concessions container by the end user. This hook is comprised of a support arm which is attachable over the rim of the cup holder of the stadium chair armrest and a stabilizing arm which is attachable to the concessions container sidewall.

A method of supporting a concessions container from the stadium chair armrest comprises the steps of dispensing a tab defining an opening to the user, the consumer of the popcorn or other concessions; attaching the tab to the concessions container; attaching a hook to the stadium chair armrest; and hanging the concessions container via the tab opening over the hook.

A primary object of the present invention is to hold a popcorn container at a theatre or stadium seat.

Another object of the present invention is that the apparatus be easy to apply to the stadium seat.

Another object of the present invention is that the apparatus be easily adaptable to all types of arm rests and/or cup holders.

Yet another object of the present invention is to accommodate all types of popcorn containers, such as bags, buckets, and boxes.

Still another object of the present invention is to meet all safety codes of a theatre environment.

Still yet another object of the present invention is that it be easily adapted into the manufacturing process of existing products.

A primary advantage of the present invention is its overall simplicity.

Another advantage of the present invention is that it is economical.

Yet another advantage of the present invention is that it does not require cleaning.

Still another advantage of the present invention is it is easily replaceable.

Still yet another advantage of the present invention is that it effectively adds comfort.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes For Carrying Out The Invention

Figure 5:
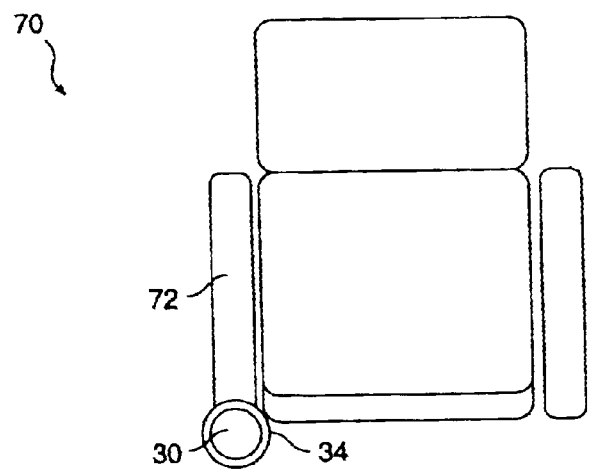
FIG. 5 is top-view of a stadium chair having a cup-holder.
Figure 6:
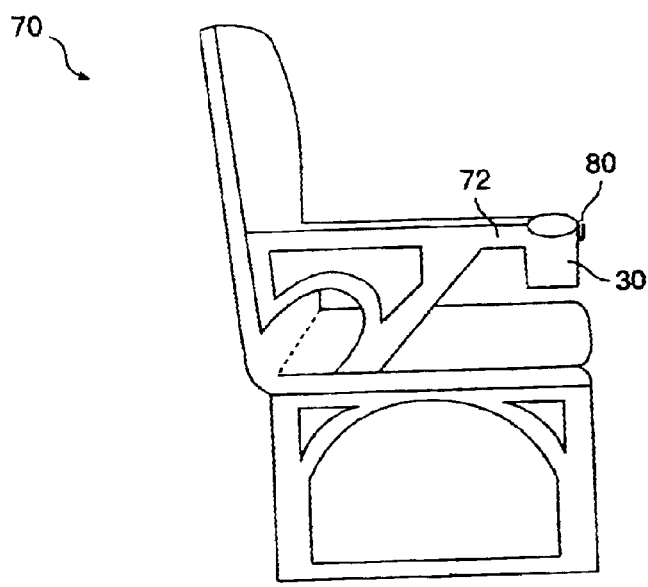
FIG. 6 is a side-view of the stadium chair of FIG. 5.

Attention is now turned to the drawings. Referring first to FIGS. 5 and 6, a stadium chair is shown generally at 70 and includes two chair arms, one chair arm 72 having cup holder 30 affixed thereto. Cup holder 30 has rear portion 32 and forward portion 34. Cup holder 30 is used to retain a cup containing a beverage as the moviegoer watches a movie. Stadium chair 70 can include chairs in theatres, and chairs in exhibition venues for sporting and cultural events for example.

Figure 1:
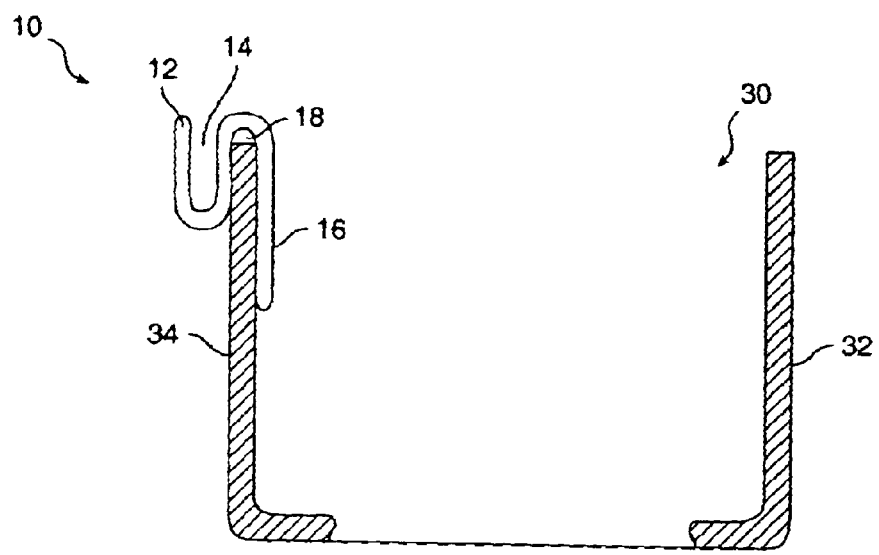
FIG. 1 is a cross-sectional view of a prior art cup-holder with the S-hook embodiment of the invention attached thereto.

FIG. 1 shows a cross-sectional view of cup holder 30 having S-hook embodiment 10 of the present invention attached to forward portion 34 of cup holder 30. S-hook 10 is fashioned from plastic, cardboard, or metal or other mostly rigid material, and comprised of receiving arm 12 and support arm 16. Support arm 16 fits over the perimeter rim of cup holder 30 and is either frictionally fitted over forward portion 34 or is adhered to the inner surface of forward portion 34 with an adhesive, for example glue, double-sided tape, or a plastic rivet. Support arm gap 18 is wide enough that the thickness of cup holder 30 can fit into S-hook 10. Receiving arm gap 14 is wide enough that a tab can be received therein as will be discussed below.

Figure 2:
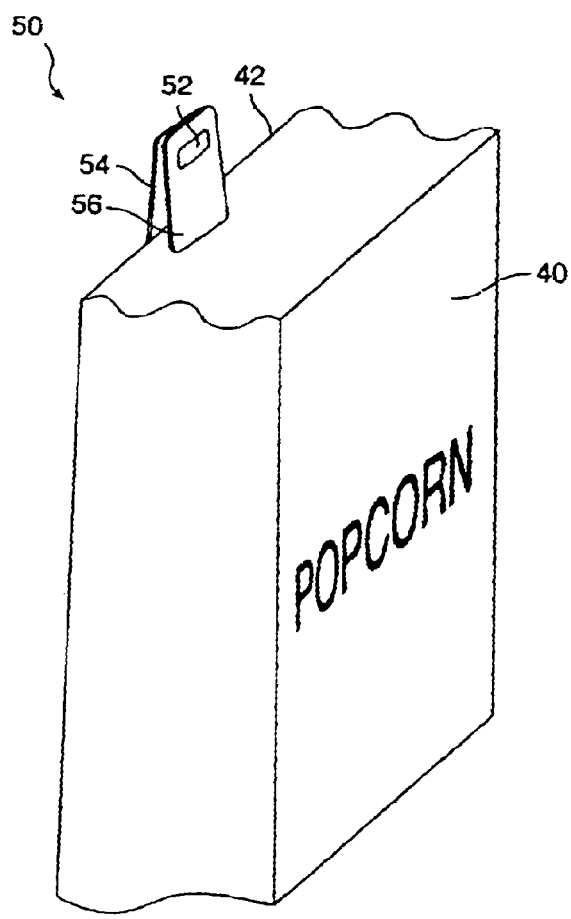
FIG. 2 is a perspective view of a popcorn bag with a first embodiment of a tab according to the invention affixed thereto.
Figure 3:
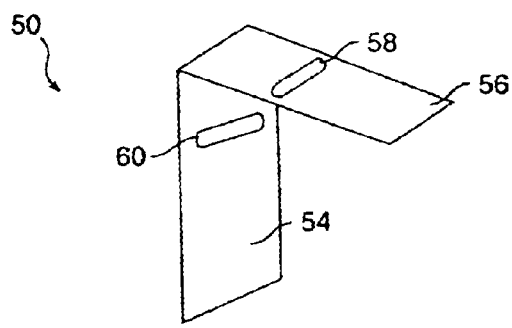
FIG. 3 is a perspective view of the tab of FIG. 2.

FIG. 2 shows one embodiment of tab 50 of the present invention affixed as with known pressure contact adhesives to popcorn bag 40. Reference is made to a "bag," but the invention as well could be practiced in conjunction with a cup, carton, box or cardboard tub as commonly encountered at concessions booths at theaters and stadiums. The apparatus can support a variety of concessions containers which include but are not limited to: popcorn bags, popcorn boxes or cartons, popcorn buckets, and candy-filled bags, boxes and buckets. Tab 50, which preferably is composed of paper or cardboard, has tab opening shown at 52 through which receiving arm 12 fits. In this embodiment, tab 50 has tab front 54 and tab back 56. Tab front 54 is adhered to the outside of a sidewall of popcorn bag 40 and tab back 56 is adhered to the inner surface of the same sidewall of popcorn bag 40 as was tab front 54. FIG. 3 depicts tab 50 before it is affixed to popcorn bag 40. In all embodiments of the invention, a receiving arm such as 12 in FIG. 1 is engageable with an opening in a tab attached to a container, such as opening 52 in tab 50 seen in FIG. 3.

FIG. 3 shows tab 50 in the open position before it is affixed to popcorn bag 40. Tab opening 52 is comprised of tab opening back 58 and tab opening front 60. When tab back 56 and tab front 54 are brought toward one another and are affixed to opposing sides of a sidewall of popcorn bag 40, tab opening back 58 and tab opening front 60 are adjacent and define in tab 50 the tab opening 52. Tab back 56 and tab front 54 can be adhered with a variety of known adhesives or methods to the inner and outer surfaces of one sidewall of popcorn bag 40. Furthermore, adhesive can be located on the inside surfaces of tab back 56 and tab front 54 above the top of popcorn bag 42 (as shown in FIG. 2) and around tab opening 52 so that tab opening back 58 and tab opening front 60 are adhered at their perimeter.

Figure 4:
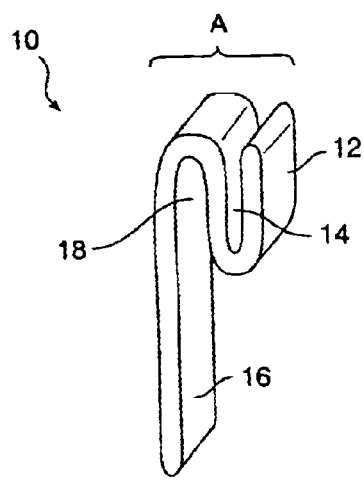
FIG. 4 is a perspective view of the S-hook of FIG. 1.

FIG. 4 shows a perspective view of S-hook 10. The length of support arm 16 and receiving arm 12 can of course be altered from that shown. The thickness of receiving arm 12 and support arm 16 can also be varied. Receiving arm 12 can also receive tab openings of alternative embodiments. Receiving arm gap 14 need only be wide enough to accommodate tab 50 and tab opening 52. Support gap 18 is wide enough to fit over the rim or edge of a portion of the cup holder 30. An adhesive or double-sided tape can be applied in support gap 18 and along the surface of support arm 16 which will be adjacent the forward portion of cup holder surface 34. Although an adhesive is not necessary, it aids in preventing S-hook 10 from being removed from cup holder 30 and provides additional stability. Alternatively, the S-hook 10 is sufficiently elastic to provide for a frictional grip fit over cup holder surface 34.

S-hook 10 preferably but not necessarily has an overall length of approximately 1 to 1½ inches with the receiving arm length being approximately ⅓ to ½ inch. The horizontal width labeled A in FIG. 4 is such that it does not significantly protrude into the space between adjacent seating rows of the theatre or stadium. This width can be approximately 3/16 to 5/16 inches, most preferably ¼ inch. The width should preferably not exceed ¼ inch. Dimensions are provided not by way of critical limitation, but to highlight the unobtrusive character of the preferred embodiment, which poses no risks to moviegoers in the event of fire or other occasion for emergency exit.

Figure 7:
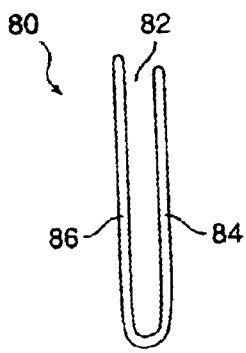
FIG. 7 is a side view of an alternate U-hook embodiment of the present invention.

FIG. 7 shows a side view of an alternative U-hook embodiment of the invention, shown generally at 80, of the present invention. In this embodiment, support arm 86 is affixed to forward portion 34 of cup holder 30 with, for example, adhesive or double-sided tape. Receiving arm 84 is inserted into tab opening 52 of tab 50 or any tab opening as provided in alternative embodiments. Receiving arm gap 82 is sufficiently wide to enable tab 50 to be inserted over receiving arm 84 and the opening is again not so wide that U-hook 80 protrudes into the aisle passage between adjacent seating rows.

Figure 8:
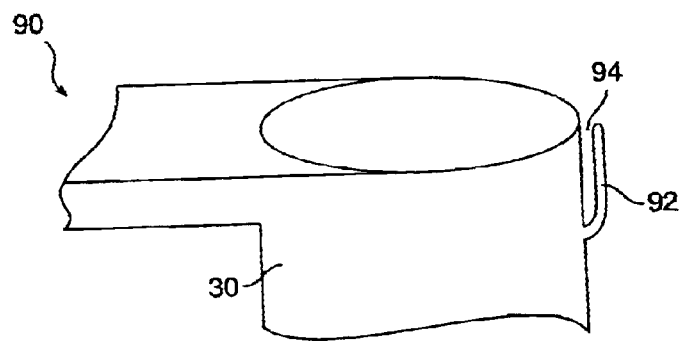
FIG. 8 is a side view of an integral U-hook embodiment of the invention molded into the cup-holder.

FIG. 8 shows a side view of an integral U-hook embodiment according to the invention wherein U-hook 90 is integrally molded into cup holder 30 during manufacture of cup holder 30. Receiving arm 92 is inserted into the opening in the tab that will be hung over receiving arm 92. Receiving arm gap 94 is sufficiently wide enough to receive the tab and not wide enough to protrude into the passage between adjacent seating rows.

Figure 9:
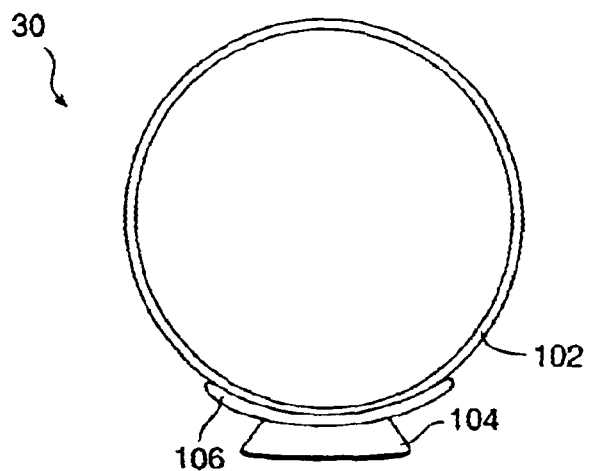
FIG. 9 is a top-view of a modified U-hook embodiment of the invention affixed to the cup-holder.
Figure 10:
FIG. 10 is a front-view of the modified U-hook of FIG. 9.
Figure 11:
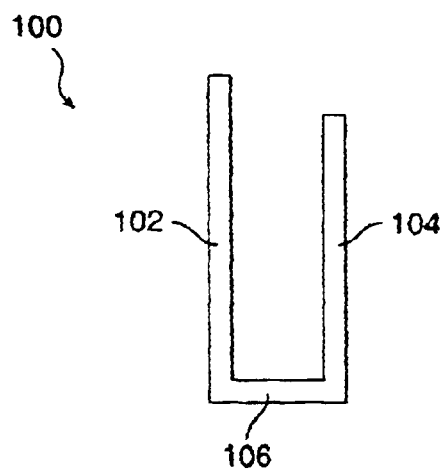
FIG. 11 is a cross-sectional view of the modified U-hook of FIG. 9.

FIG. 9 shows a top view of a modified U-hook embodiment affixed to cup-holder 30. In this embodiment, the support arm is comprised of flexible backplate 102. Receiving arm 104 is connected to flexible backplate 102 by bridge 106 (see FIG. 11). Flexible backplate 102 may extend further than shown, or even all the way around cup holder 30. FIG. 10 is a front view of the modified U-hook of FIG. 9. It is shown in this figure that notches, such as at 110, are provided in receiving arm 104 as well as in flexible backplate 102 so that modified U-hook 100 is sufficiently flexible to conform to the contour of cup holder 30 or armrest for adhesion thereto. FIG. 11 shows a cross-sectional view of modified U-hook 100 and bridge 106 is clearly shown linking receiving arm 104 and flexible backplate 102. Again, as with all previously described embodiments, the receiving arm 104 is engageable with an opening in a tab by inserting the tab opening over the receiving arm (e.g. opening 112 in FIG. 13).

Figure 12:
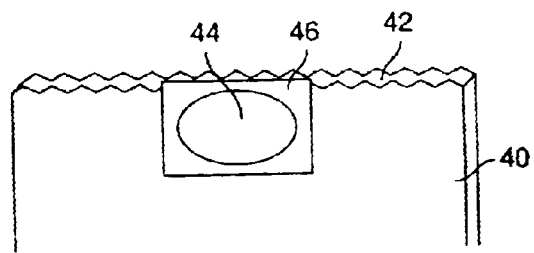
FIG. 12 is a front-view of a second embodiment of the tab according to the present invention, having an opening at the top of the popcorn bag.
Figure 13:
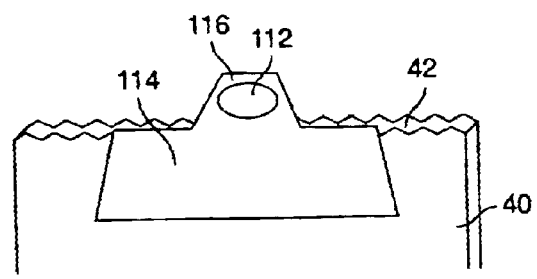
FIG. 13 is a front-view of a third embodiment of the tab with opening according to the present invention.
Figure 14:
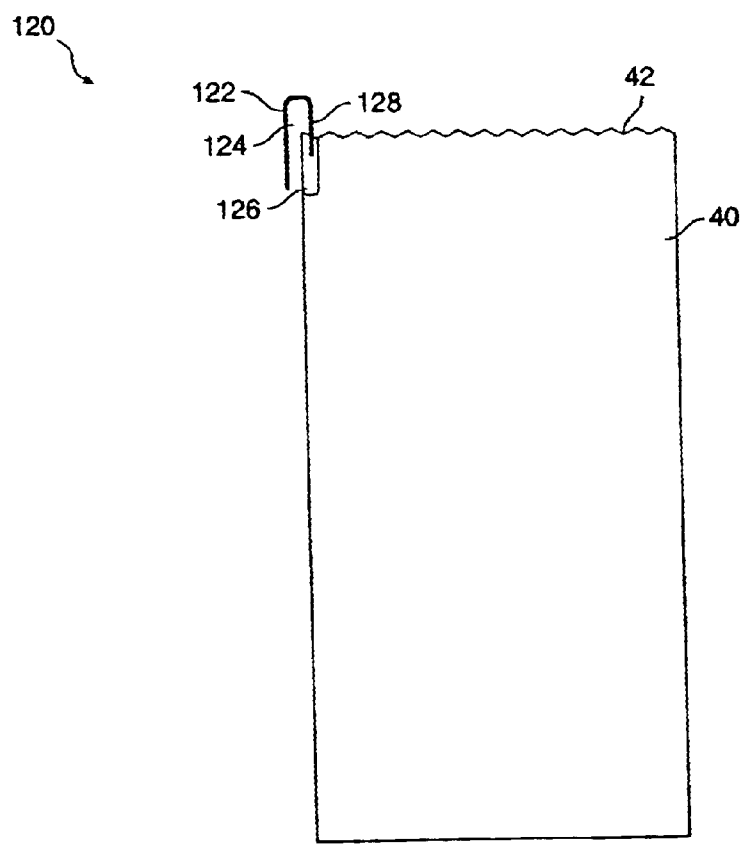
FIG. 14 is a side view of an integral hook and tab embodiment of the present invention.

FIGS. 12, 13 and 14 show various embodiments of the tab element of the present invention. FIG. 12 shows the opening, that is to fit over the hook, located in the sidewall of popcorn bag 40 near top 42 of popcorn bag 40. Hole 44 is defined in and by the sidewall of popcorn bag 40 and is manufactured into popcorn bag 40 and surrounded by stabilizing piece 46 for added rigidity and strength while hanging popcorn bag 40 from any embodiment of the hook according to the invention. FIG. 13 shows another alternative embodiment of the tab of the present invention. In this embodiment, tab support 114 is affixed to just one surface of a sidewall of popcorn bag 40. Tab support 114 can be affixed to either an inner or an outer surface of a sidewall of popcorn bag 40. Tab support 114 extends above top of popcorn bag 42 and defines tab opening 112 therein which engages the hook component of the invention. This embodiment can either be manufactured into popcorn bag 40, or be attached with adhesive by the end-user. It should be noted that any of the openings described in the various embodiments of the tab of the present invention can fit with any of the hook embodiments described.

FIG. 14 shows an integral hook embodiment 120 of the present invention wherein hook 120 preferably is manufactured into, or alternatively adhered to, popcorn bag 40. Integral hook 120 is comprised of support arm 122 and is affixed to a sidewall of popcorn bag 40 with stabilizing piece 126 and stabilizing arm 128. Support arm gap 124 provides a place into which the rim of cup holder 30 fits. In other words, support arm 122 is placed over the rim of cup holder 30 and slid downward toward the theater floor to hook onto the rim of cup holder 30.

Figure 15:
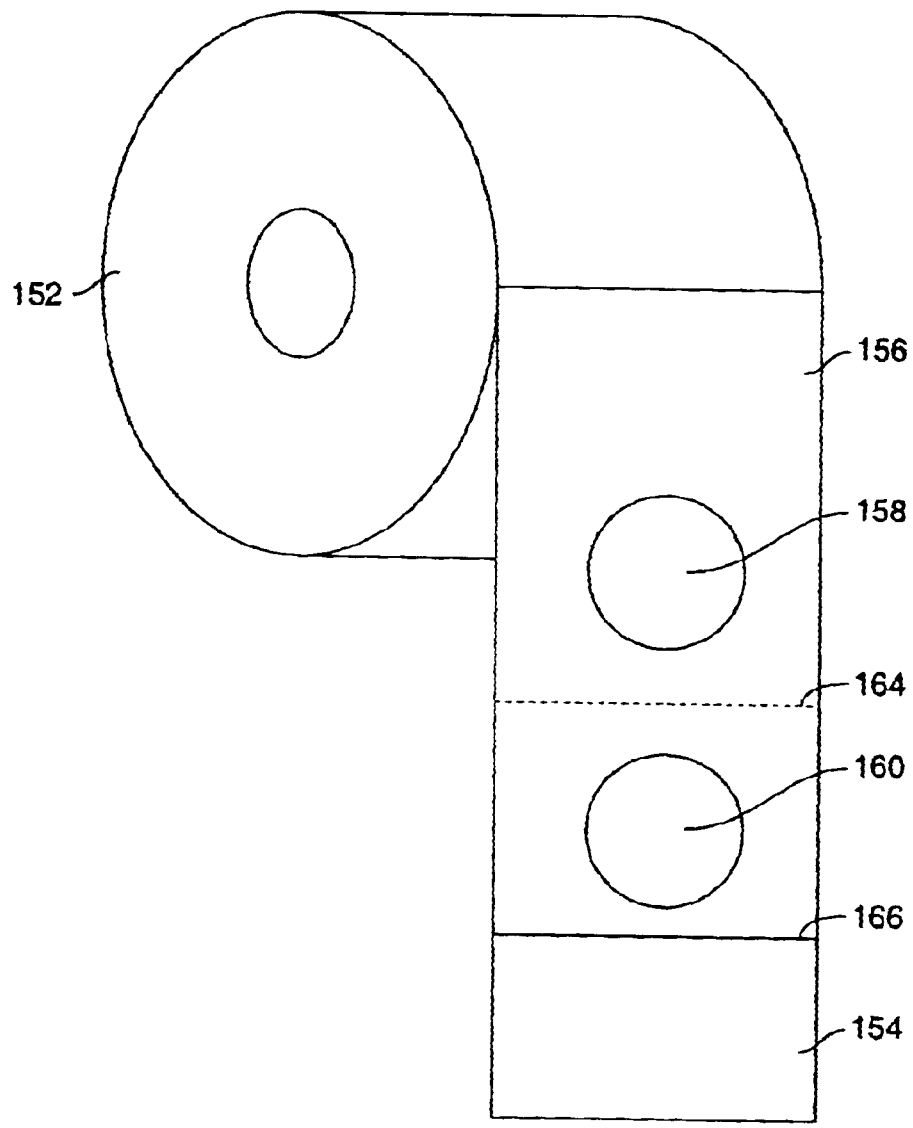
FIG. 15 is a perspective view showing a roll of the attachable tabs of the present invention which fits onto a label dispenser for dispensing the tabs.

FIG. 15 shows a roll of tabs to be dispensed by a dispenser. A roll of tabs is shown at 152. Tabs can be unrolled and torn off one at a time and then adhered to a sidewall of a popcorn bag such as shown in FIG. 2. This is performed by the end-user of the device. For example, a theatre employee can dispense a tab to the movie-goer who then affixes it to her popcorn bag, but preferably the employee attaches the tab prior to filling the container with popcorn. Much like the embodiment shown in FIG. 2, tab opening back 158 connects to tab opening front 160 when folded at perforation 164 after having torn one tab from tab roll 152. Tab back 156 has an adhesive coating on one side and may be adhered to the inner surface of a sidewall of popcorn bag 40. Similarly, tab front 154 has an adhesive coating and is adhered to an outer surface of the same sidewall of popcorn bag 40, thereby bringing tab opening back 158 and tab opening front 160 together to form a single opening. Line 166 indicates the top of the popcorn bag so that the user can easily visualize where to adhere the tab. A variety of materials can be used to form the tabs, be it plastic, paper, or any material of sufficient strength to support the weight of popcorn.

It is to be noted that the above descriptions of the various embodiments include embodiments wherein the hook support arm is temporarily attachable to the stadium chair armrest and embodiments wherein the hook support arm is permanently attachable to the armrest. The support arm is temporarily attachable when no adhesive or other connecting means is used upon a surface of the armrest or cup holder and is engaged via a frictional fit. Without adhesive or connecting means, such as a rivet, the hook is readily removable. When the hook is adhered to the armrest with an adhesive or other means such as, but not limited to, double-sided tape, glue or a rivet, it is permanently attached and the user cannot readily remove the hook from the stadium chair. Of course when the hook is molded into the armrest or cup holder it is even more permanent.

Although only a few embodiments have been demonstrated for the hook and tab of the present invention, many variations can be accomplished and would be obvious to those skilled in the art. The device is shown as being used with a popcorn bag and cup holder, however, the device can be used on any kind of concession-holding bag, box, bucket or the like. The various embodiments of the hook have been shown to be attached to the cup holder, however a cup holder is not necessary to accomplishing the invention. The hook could be attached directly to an arm rest or any surface for easy access by the user. Tab openings were shown in both circular and rectangular shapes, but of course any shape could be used.

The present invention has many advantages, including that it is safe. The present invention meets the Uniform Fire Code (UFC), Uniform Building Code (UBC), and NFPA 101 Life Safety Code. The tab in all of its embodiments also is manufactured with FDA-approved materials for indirect and direct food contact. Because of the simplicity and small size of the apparatus, in particular the fact that the total thickness of each embodiment of the hook element would extend from the cup holder only a preferred maximum of about 5/16", it does not block pedestrians who are trying to exit the rows of seats. This is a significant advantage of the invention. If there were to be a fire and each moviegoer had popcorn, then debris would inevitably be on the floor creating a hazard. If there were to be a fire and each moviegoer had a bag, box or bucket of popcorn hanging from their respective hooks, then it is possible that pedestrians exiting the rows would bump into the popcorn containers. The rounded edges of the hooks and the fact that the hanging popcorn or other container freely swings when bumped without falling permits safe, efficient, and fast exit from the rows of seats to the aisle.

Industrial Applicability

The invention is further illustrated by the following non-limiting example.

EXAMPLE

A prototype of the present invention was constructed using 1½"×4" tabs for the embodiment shown in FIG. 15, and the material used was TVYEK brand fabric. An S-hook was constructed from plastic and the thickness of the receiving arm 12 and support arm 16 was made to be approximately 0.0625 inches. The S-hook constructed was very similar to that shown in FIG. 4. The width from receiving arm 12 to support arm 16 as shown at A in FIG. 4 was made to be 0.4612 inches. The outside radius of support gap 18 was 0.165 inches and the inner radius of support gap 18 was 0.105 inches. The outside radius of receiving arm gap 14 was 0.093 inches to enable receiving a typical cup holder rim.

The prototype tab can be dispensed from the tab dispenser as shown in FIG. 15. The length of one tab was approximately four inches. The width of the tab was approximately 1½". The diameter of each tab opening, 158 and 160, was ¾". Therefore, when folding at perforation 164, tab length becomes 2". Of this length, approximately ⅞" extends below the very top of the popcorn bag as shown at 42. Line 166 demonstrated this so that the ⅞" could be easily placed on the surface of the bag by the user. There was approximately 1" of material between the lower portion of each tab opening and the ends of the tab. Using the prototype hook and tab, users have successfully placed the tab onto a popcorn container, affixed the hook to stadium chair armrest cup holders, hung their popcorn container on the hook and enjoyed comfortable consumption of their popcorn.

The preceding example can be repeated with similar success by substituting the generically or specifically described embodiments of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. In combination with a stadium chair armrest, an apparatus for supporting a concessions container upon said armrest, wherein:

said armrest comprises a circular cup-holder; and said apparatus comprises:
   a tab adhesively attachable to a concessions container, and said tab surrounding and defining an opening; and
   a rigid S-hook defining a support arm engageable with a rigid rim of said cup-holder and a receiving arm insertable through said opening in said tab, wherein when said tab is adhesively attached to the concession container and said receiving arm is inserted through said opening, the concessions container may be hung, by said tab, from said rigid rim.

2. The apparatus of claim 1 wherein said S-hook has an overall horizontal width of between approximately 3/16 and 5/16 inches.

3. The apparatus of claim 1 wherein said support arm is permanently engaged with said rigid rim.

4. The apparatus of claim 3 wherein said support arm is attached to said rim with a material selected from the group consisting of adhesive, double-sided tape, glue, and rivet.

5. The apparatus of claim 1 wherein said tab further comprises a tab front and a tab back, wherein said tab front and said tab back are adhesively attachable to the inside and outside surfaces of a side wall of the concessions container.

6. The apparatus of claim 1 wherein said tab is attachable to one surface of a side wall of the concessions container.

7. An apparatus for supporting concessions upon a stadium chair armrest, said apparatus comprising:

a stabilizing piece integral with a concessions container defining an opening in a side wall of the concessions container; and a hook comprising:
   a support arm is attached to said stadium chair; and
   a receiving arm engagable with said opening in said stabilizing piece.

* * * * *